United States Patent [19]

Duyvesteyn et al.

[11] Patent Number: 5,178,848
[45] Date of Patent: Jan. 12, 1993

[54] LITHIUM METATUNGSTATE

[75] Inventors: Willem P.C. Duyvesteyn, San Jose; Houyuan Liu, Sunnyvale; Nicholas L. Labao, San Jose; Purusotam L. Shrestha, Sunnyvale, all of Calif.

[73] Assignee: BHP-Utah International Corp., Sunnydale, Calif.

[21] Appl. No.: 720,915

[22] Filed: Jun. 25, 1991

[51] Int. Cl.$^5$ .............................................. C01D 15/00
[52] U.S. Cl. ...................... 423/593; 252/60; 423/606; 423/646; 423/641; 423/53; 423/179; 423/179.5; 423/183
[58] Field of Search ................ 423/53, 54, 179, 179.5, 423/181, 183, 187, 194, 196, 641, 646, 593, 606; 494/37; 252/60

[56] References Cited

U.S. PATENT DOCUMENTS

| | | | |
|---|---|---|---|
| 4,346,061 | 8/1982 | Goddard | 423/54 |
| 4,360,503 | 11/1982 | Boyer et al. | 423/54 |
| 4,369,165 | 1/1983 | Kim et al. | 423/54 |
| 4,557,718 | 12/1985 | Kamps et al. | 423/606 |

OTHER PUBLICATIONS

A. S. Voronina and S. A. Bogatyreva, "Equilibrium Centrifugation in Lithium Metatungstate and [tris(hydroxymethyl)amino]methane phosphotungstate", Molekulyarnaya Biologiya (Molecular Biology), vol. 14, No. 1, pp. 190–199 (1980).

*Primary Examiner*—Theodore Morris
*Assistant Examiner*—Edward Squillante
*Attorney, Agent, or Firm*—Hopgood, Calimafde, Kalil, Blaustein & Judlowe

[57] ABSTRACT

Lithium metatungstate as a new composition of matter and the production thereof are disclosed. A solution of lithium monotungstate is treated with an extractant to remove sufficient lithium ions to produce a dilute solution of lithium metatungstate and the dilute solution is then concentrated. Lithium metatungstate solutions are more dense than other alkali metal metatungstates and have lower viscosities which properties make the solutions highly useful for heavy media separations.

14 Claims, 1 Drawing Sheet

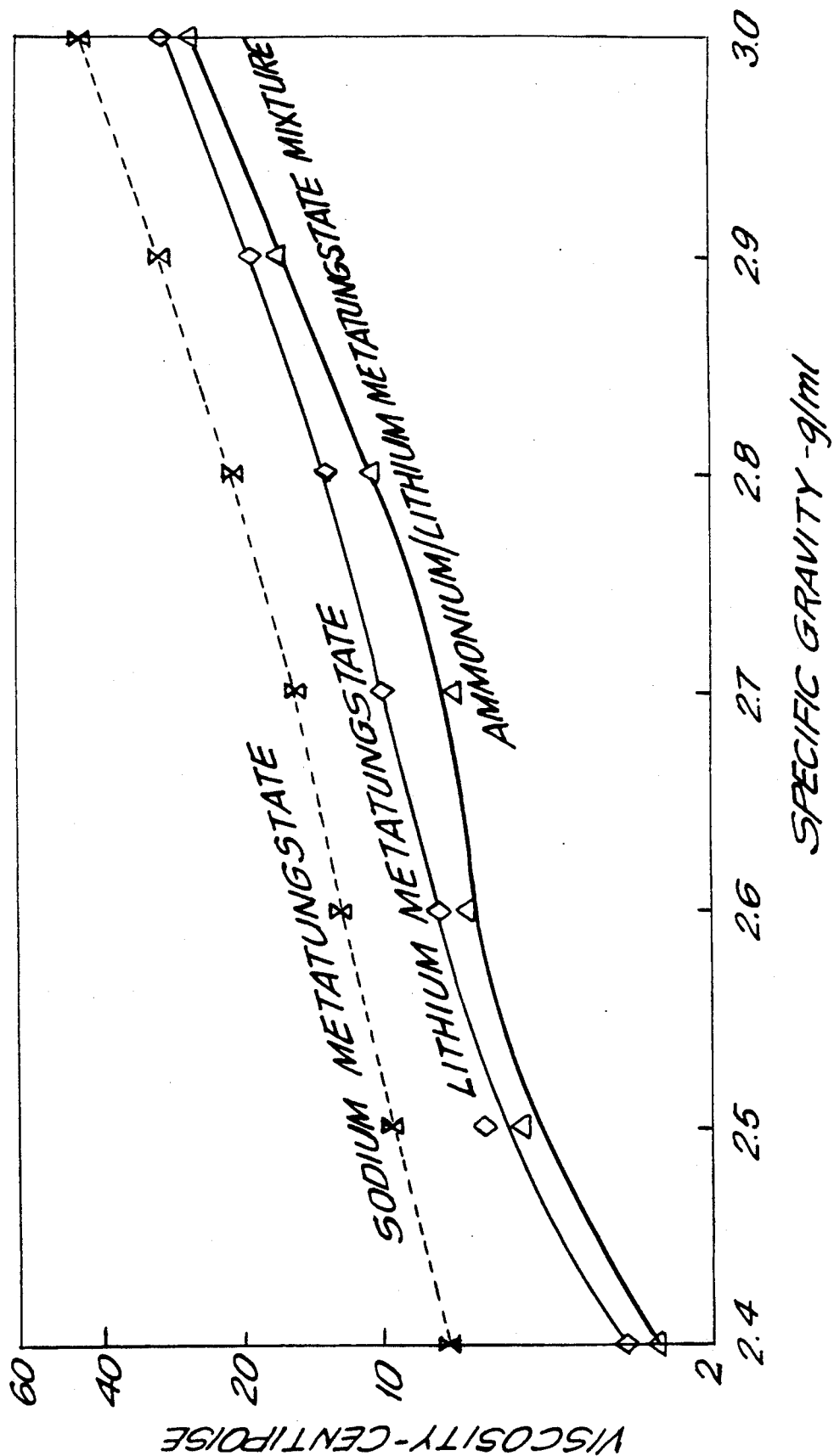

LITHIUM METATUNGSTATE

FIELD OF THE INVENTION

The present invention relates to lithium metatungstate and to its production and use.

BACKGROUND OF THE INVENTION

Metatungstates of sodium and ammonia are known in the art. Sodium metatungstates [$Na_6(H_2W_{12}O_{40}) \cdot 3H_2O$] and ammonium metatungstate [$(NH_4)_6(H_2W_{12}O_{40}) \cdot 3H_2O$] display high solubilities in water and other solvents. The high solubilities of metatungstates make them useful, among uses, as catalysts.

A use of sodium metatungstate and ammonium metatungstate, which use relies both on the high densities and solubilities of these compounds, is disclosed in U.S. Pat. No. 4,557,718. This patent discloses the use of metatungstate solutions for heavy media separation processes. High concentrations of sodium metatungstate dissolved in water provide true solutions, as distinguished from solutions having finely divided solids suspended therein, having densities up to about 3.1 grams per cubic centimeter (g/cc).

BRIEF DESCRIPTION OF THE INVENTION

The present invention relates to a new composition of matter which comprises lithium metatungstate and a process for its production and use.

Lithium metatungstate is produced by establishing an aqueous solution of lithium monotungstate. The lithium monotungstate solution is subjected to an ion exchange treatment to exchange between about 70% and 80% of the dissolved lithium ions with hydrogen ions to produce a dilute solution of lithium metatungstate. The dilute solution can be concentrated, and lithium metatungstate can be crystallized from the concentrated solution. Advantageously, the dilute solution is concentrated to provide a solution having a density greater than about 3.2 g/cc.

THE FIGURE

The FIGURE is a graph showing the relationship between solution viscosities and densities of a prior art composition and the composition of the present invention.

DETAILED DESCRIPTION

As noted hereinbefore the present invention relates to a composition of matter which is lithium metatungstate. Lithium metatungstate can be represented by the formula $Li_6(H_2W_{12}O_{40}) \cdot 3H_2O$ in the crystalline state or as $Li_6(H_2W_{12}O_{40})$ in solution.

Although lithium is the least dense of the alkali metals, aqueous solutions of lithium metatungstate are more dense than aqueous solutions of the other more dense alkali metal metatungstates. For example, the maximum density of a sodium metatungstate solution is only about 3.1 g/cc whereas the maximum density of an aqueous lithium metatungstate is about 3.5 g/cc. As will be described hereinafter, true solutions (i.e. solutions not containing suspended solids) having high densities are useful for heavy media separation processes.

Lithium metatungstate or aqueous solutions thereof can be prepared by forming a lithium monotungstate solution, removing sufficient lithium ions from the solution by ion exchange to form a dilute lithium metatungstate solution and concentrating the dilute solution.

Lithium monotungstate solutions can be formed by dissolving tungsten trioxide in a lithium hydroxide solution. The tungsten trioxide can be derived from any source. If a more pure form of tungsten trioxide is desired, it can be produced by roasting ammonium paratungstate at temperatures exceeding about 300° C., advantageously at temperatures between about 400° C. and 425° C., to dissociate the ammonium paratungstate to ammonia and tungsten trioxide. The roasting operation should be conducted at a sufficiently high temperature and/or for sufficiently long time to insure substantially complete removal of ammonia because ammonia can interfere with subsequent processing.

Tungsten trioxide from whatever source is dissolved in an aqueous solution of lithium hydroxide. The lithium hydroxide solution has a molarity of at least about 0.7 (80 g/l $WO_3$), advantageously between about 0.9 (100 g/l $WO_3$) and 1.1 (120 g/l $WO_3$), in order to provide lithium monotungstate solutions having satisfactory concentrations. Tungsten trioxide is added to the lithium hydroxide solution while the solution is agitated to promote dissolution. Dissolution of tungsten trioxide is conducted at room temperature or above. Addition of tungsten trioxide is terminated as the pH value of the solution falls to a value of about 11, eg. between about 9 and 12. Any ammonia associated with the feed materials should be removed from the solution at this stage, otherwise, ammonium metatungstate may precipitate during subsequent processing rendering the product less useful. Agitation of the solution is maintained and is heated to elevated temperatures, i.e. above about 70° C., to expel any ammonia that may have been associated with the tungsten trioxide. Since the tungsten trioxide feed is never completely free of ammonia, this latter step cannot be dispensed with.

The lithium monotungstate solution derived by dissolving tungsten trioxide in lithium hydroxide is then treated by ion exchange to form a solution containing lithium metatungstate. Any number of ion exchange processes can be employed and the present invention is not limited to any one ion exchange process. Whatever ion exchange process is employed sufficient lithium must be removed from solution to form lithium metatungstate, i.e. between about 70% and 80% of the lithium ions must be removed. Lithium extraction is controlled by conducting the ion exchange process until the pH of the accumulated solution has finally reached to a value between about 3.5 and 5.0, advantageously between about 4.0 and 4.5. As lithium is extracted from the solution, the pH value of the solution falls to a value below about 2 and then raises to between 3.5 and 5.0. Lithium extraction is terminated only after the pH value stops falling and begins to rise.

Ion exchange treatment of lithium monotungstate solutions to remove lithium ions from solution can, as noted hereinbefore, be accomplished by well-known techniques and ion exchange compositions. Liquid ion exchange processes in which the effective lithium ion extractant is dissolved in a water immiscible solvent can be employed or lithium ion extractant resins can be employed. Examples of useful extractants are AMBERLITE 120 Plus, AMBERLITE IR-132C, AMBERLITE IR-118, AMBERLITE IR-122 and STRATABEAD-122. (AMBERLITE and STRATABEAD are trademarks owned by Rohm and Haas). Whatever lithium ion extractants are used they should be in the hydrogen form. The lithium-loaded extractant can be regenerated by treatment with an inorganic acid such as hydrochloric acid or sulfuric acid.

The lithium metatungstate solution resulting from ion exchange processing is relatively dilute, i.e. a density less than about 1.1 g/cc, and will ordinarily be concentrated. Concentration can be achieved by evaporation by heating, vacuum treatment, simultaneously heating in a vacuum, reverse osmosis or a combination of any of these operations. It has been found that the formation of lithium paratungstate can be minimized or completely avoided by saturating the lithium tungstate solution with colloidal tungsten trioxide. The colloidal tungsten trioxide can be recycled and any make-up can be produced from tungsten acid. The stability of the tungsten solutions, particularly the lithium metatungstate solution is enhanced, particularly during the concentration, if air or oxygen is excluded during processing.

In order to provide those skilled in the art a better appreciation of the present invention the following nonlimiting example is given.

EXAMPLE I

To produce a batch of about 50 pounds of LMT solution with a 3.4 g/cc density the following procedure was followed.

Fifty pounds of APT was roasted in a rotary kiln at 400° C. for four hours. 7.2 kg of $LiOH \cdot H_2O$ were dissolved in 200 liters of deionized water. Between 22 and 23 kg of calcined APT were added to the lithium hydroxide solution, the exact quantity of $WO_3$ was determined by maintaining an endpoint pH of 11.0.

The resulting lithium monotungstate solution contained approximately 100 gpl $WO_3$. The lithium monotungstate solution was heated to over 70° C. while maintaining the pH value at about 11 and was strongly agitated to expel any ammonia. The solution was then contacted with a strong base cationic ion exchange resin, AMBERLITE IR 120 Plus (in the hydrogen form). By exchanging 75% of the lithium for hydrogen ions the monotungstate solution was converted to metatungstate, according to:

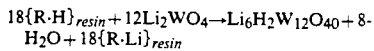

$$18\{R \cdot H\}_{resin} + 12Li_2WO_4 \rightarrow Li_6H_2W_{12}O_{40} + 8 H_2O + 18\{R \cdot Li\}_{resin}$$

wherein $\{R \cdot H\}_{resin}$ represents the AMBERLITE IR 120 Plus cationic resin in the H-form.

Three batches of 67 liter of monotungstate solution were passed down-flow three IX columns, each containing 15 liter of AMBERLITE IR 120 Plus at a rate of 1.3 liters per minute, removing lithium from the solution and converting mono- to metatungstate. This was continued until the pH of the accumulated column discharge reaches a value of about 4.25. The resin is rinsed with deionized water and the rinse water being re-used for preparation the next batch of LMT. The resin was converted to the H-form by contacting it with hydrochloric acid.

Complete conversion of the mono- via the pseudometa- to the metatungstate species takes place if the solution is digested for about 5 hours at the boiling point, typically about 105° C. So the 200 liter of LMT solution was continuously fed to an evaporator where steam was used indirectly to maintain the solution temperature at the boiling point. About 0.5 to 1 kilogram of recycle "colloidal" $WO_3$ was added to keep the solution fully saturated in $WO_3$. After the volume was reduced from 200 liter to about 25 liter, the concentrated solution was transferred to a vacuum crystallizer where the LMT-solution was cooled to about 85° C.

More water was removed from the LMT-solution in the vacuum crystallizer where the volume was reduced to about 7.5-8.0 liters over a four hour period. The solution had reached a density of about 3.0 g/cc. After cooling the solution the "colloidal" $WO_3$ was removed from the solution by two stages of filtration, using 11 and a 2.5 micron filter papers. The final density of 3.4 was obtained by air drying of the filtered solution.

Lithium metatungstate solutions in accordance with the present invention are useful in mineral separation processes and coal washing. For example, diamonds (density about 3.5 g/cc) are often associated with silicate minerals, eg. diopside ($Ca_2MgSi_2O_6$) which have densities between about 3.1 g/cc and 3.4 g/cc, can be separated with a lithium metatungstate solution diluted to have a density less than about 3.5 g/cc so that any diamonds sink while the silicate gangue can be floated off. The high density of lithium metatungstate solutions in accordance with the present invention allows selective separation of multiple minerals because dilution or addition of more lithium metatungstate permits operation over a large range of densities.

In the following Examples, approximately 80 ml of lithium metatungstate having the specified density was poured in a 125 ml separatory funnel and introduced 40-60 g of deslimed sample (size $-20/+325$ mesh). The content was stirred until all the minerals grains are wet and subsequently centrifuged at 600 rpm for 5 minutes. Separation was very clean and the sink was removed and washed three times with warm water, then dried and weighted.

EXAMPLE II

Geochronologists often use carcinogenic methyl iodide to separate pure apatite, $Ca_5(PO_4)_3(F,Cl,OH)$ with a density of 3.15-3.20 g/cc, for radiometric age determination of rocks. Lithium metatungstate is a useful substitute for carcinogenic organic heavy liquids as lithium metatungstate of density 3.15 g/cc can remove unwanted light fractions as a float; similarly at a density of 3.20 g/cc it can remove unwanted fractions as a sink, leaving pure apatite.

EXAMPLE III

Another use of lithium metatungstate is in the heavy mineral sand industry for laboratory testing of heavy mineral assemblages. They usually contain varying amounts of uneconomic heavy minerals, e.g., pyroxenes, amphiboles, and epidote, and their density is usually less than 3.4 g/cc.

Several duplicate samples were separated using lithium metatungstate and TBE (tetra-bromo-ethane) using the procedure described earlier. The results are presented in Table 1 in which the percentage of the heavy mineral recovered as the sink fraction is separated.

TABLE 1

| Sample # | % of Heavy Mineral using LMT | % of Heavy Mineral using TBE |
|---|---|---|
| NCS1, 10-15 | 1.98 | 1.63 |
| NCS1, 50-55 | 3.10 | 3.09 |
| NCS1, 55-60 | 2.57 | 2.12 |
| NCS2, 10-15 | 4.24 | 4.57 |
| NCS2, 20-25 | 1.55 | 1.67 |

EXAMPLE IV

Three large samples of heavy mineral sand assemblages were split into ten sub-samples each. The individual samples were separated using the procedure described earlier. The results in the percentage of recovered sink fraction are presented in Table 2.

TABLE 2

| Sample Number | Batch A: % of heavy mineral | Batch B: % of heavy mineral | Batch C: % of heavy mineral |
| --- | --- | --- | --- |
| 1 | 1.36 | 1.61 | 5.71 |
| 2 | 1.39 | 1.43 | 5.67 |
| 3 | 1.41 | 1.66 | 5.85 |
| 4 | 1.36 | 1.68 | 5.97 |
| 5 | 1.40 | 1.67 | 5.97 |
| 6 | 1.34 | 1.74 | 5.80 |
| 7 | 1.43 | 1.73 | 5.90 |
| 8 | 1.36 | 1.47 | 6.03 |
| 9 | 1.37 | 1.50 | 5.77 |
| 10 | 1.38 | 1.73 | 5.83 |
| Average | 1.38 | 1.62 | 5.85 |
| St. Dev.n | 0.03 | 0.11 | 0.119 |
| Variance | 0.0007 | 0.01 | 0.0125 |

EXAMPLE V

In mica-rich heavy mineral sand assemblages, undesirable mica will report to the sink fraction when conventional liquids of 2.9 g/cc density are used. The presence of high amounts of mica in the heavy fraction causes erroneous mineralogical assessment of heavy mineral. Therefore, mica-rich heavy mineral sand fractions were subjected to a sink and float test using lithium metatungstate of density 3.1 g/cc. The sink fraction was dried, weighted, and examined under optical microscope, no mica was observed.

Another use for lithium metatungstate solutions is in the field of coal testing. Density is not as important as in other mineral separations, however, the chemical analysis assumes greater importance since sodium metatungstate solutions can interfere with the all important sodium analysis of the ash and ammonium in ammonium metatungstate can interfere with the nitrogen and hydrogen analysis of the coal.

Another advantage of lithium metatungstate solutions in accordance with the present invention is that these solutions despite their high densities have significantly lower viscosities than solutions of other metatungstate having approximately the same density. The FIGURE is a graph of the viscosities of different metatungstates versus the densities of these solutions. Reference to the FIGURE clearly shows that lithium metatungstate solutions have unexpectedly and significantly lower viscosities than prior art tungstate solutions. Lower viscosities are particularly advantageous when using metatungstate solutions for heavy media separation processes when the materials being separated have low densities or are in a finely divided state because finely divided solids will more rapidly sink or float, depending upon their densities, in solutions having lower viscosities.

Although the viscosity of lithium metatungstate solutions are significantly lower than prior art solutions, the viscosities can be lowered even more by adding ammonium metatungstate to the lithium metatungstate solution as shown in the FIGURE. In addition the density of the lithium metatungstate solution can be further increased by suspending finely divided heavier solids as is well known in the art.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A composition of matter comprising lithium metatungstate dissolved in water to provide a solution having a density of at least about 3.2 g/cc.

2. The composition of matter as described in claim 1 wherein the solution has a density of at least about 3.4 g/cc.

3. The composition of matter as described in claim 2 wherein the solution has a density of about 3.5 g/cc.

4. A process for producing lithium metatungstate which comprises establishing an aqueous solution of lithium monotungstate, treating the lithium monotungstate solution with a cation extractant to lower the pH value of the solution to between about 3.5 and 5.0 to produce a dilute solution of lithium metatungstate and removing water from the dilute solution to provide a concentrated lithium metatungstate solution.

5. The process as described in claim 4 wherein the lithium monotungstate solution is established by dissolving tungsten trioxide in an aqueous solution of lithium hydroxide.

6. The process as described in claim 5 wherein the lithium monotungstate solution has a final pH value between about 9 and 12.

7. The process as described in claim 4 wherein the lithium monotungstate solution is heated to a temperature above about 70° C. and is subjected to agitation to expel any ammonia associated with the solution.

8. The process as described in claim 4 wherein water is removed from the dilute lithium metatungstate solution by evaporation.

9. The process as described in claim 4 wherein water is removed from the dilute lithium metatungstate solution by reverse osmosis.

10. The process as described in claim 4 wherein sufficient water is removed from the lithium metatungstate solution to provide a concentrated solution having a density greater than 3.2 g/cc.

11. The process as described in claim 10 wherein colloidal tungsten trioxide is added to the dilute lithium metatungstate to minimize the production of lithium paratungstate as water is being removed.

12. The process as described in claim 11 wherein the dilute solution is saturated with colloidal tungsten trioxide.

13. The process as described in claim 4 wherein water is removed from the dilute solution of lithium metatungstate in the absence of air.

14. The process as described in claim 4 wherein lithium ions are extracted from the lithium monotungstate solution in the absence of air.

* * * * *